United States Patent [19]

Ernsting et al.

[11] Patent Number: 4,959,239

[45] Date of Patent: Sep. 25, 1990

[54] PROCESS FOR PREPARING AN EDIBLE DISPERSION

[75] Inventors: Peter B. Ernsting, Delft; Jan Van Heteren; Tjaard R. J. Niemeyer, both of Vlaardingen, all of Netherlands

[73] Assignee: Lever Brothers Company, New York, N.Y.

[21] Appl. No.: 266,046

[22] Filed: Nov. 2, 1988

[30] Foreign Application Priority Data

Nov. 4, 1987 [GB] United Kingdom ............... 8725803

[51] Int. Cl.$^5$ ............................................... A23D 3/02
[52] U.S. Cl. .................................... 426/603; 426/581; 426/664
[58] Field of Search .................... 426/603, 581, 664

[56] References Cited

FOREIGN PATENT DOCUMENTS 4937379  2/1980  Australia .
0185000  6/1986  European Pat. Off. .
0185631  6/1986  European Pat. Off. .
2195352  4/1988  United Kingdom .

Primary Examiner—Marianne Cintins

[57] ABSTRACT

A process for preparing an edible plastified dispersion comprising a continuous fat phase and a dispersed aqueous phase, said process comprising the steps of:
(a) working buttermilk with a non-dairy fat to obtain an emulsion, and,
(b) mixing the emulsion obtained in step (a) with butter under mild working conditions.

By employing such a process, it is possible to obtain a melange product in which the characteristic microstructure of butter has not been destroyed. Moreover, only a proportion of the total fat content of the final product need be passed through the churn, enabling a higher production figure to be obtained with a fixed size of churn.

4 Claims, 2 Drawing Sheets

PROCESS FOR PREPARING AN EDIBLE DISPERSION

FIELD OF THE INVENTION

The present invention relates to a process for preparing an edible plastified dispersion, which dispersion comprises a continuous fat phase and a dispersed aqueous phase, and to the products of such a process.

BACKGROUND OF THE INVENTION

Examples of edible plastified dispersions comprising a continuous fat phase and a dispersed aqueous phase are butter, margarine and related products having a lower fat content, which are often referred to as low-fat spreads. Another group of products are the so-called "melange" products, which contain both butterfat and non-dairy fat. Under normal conditions the continuous fat phase of such dispersions comprises both liquid oil and fat in the solid state. (The terms oil and fat are generally used interchangeably throughout this specification unless the context demands otherwise.)

Butter has been manufactured by a "churning" process for many hundreds of years. Margarine is a more recent phenomenon.

The starting material for making butter is dairy cream, i.e. an oil-in-water (o/w) system. Typically, butter is prepared as follows: the cream, having a fat content of about 30–50 wt.%, is pasteurised and then cooled. The cream is "ripened" for a sufficient period of time to allow solid fat to crystallise. Since milkfat has a relatively high solid fat content at low temperatures, at the end of the physical ripening, at a typical temperature of about 10° C., as much as 40 wt.% of the fat may have crystallised. Subsequently, the ripened cream is churned, commonly at a temperature of about 12–15° C. In the churn, the cream separates into buttermilk and aggregates of fat globules including some aqueous phase. The buttermilk is drained off and the remaining material is kneaded and shaped into butter. The buttermilk may be used for animal feed, concentrated for use in margarine production or occasionally imbibed per se by humans.

Margarine has been made in a variety of different ways. According to one such process, described in NL-A- 176 520, margarine is made starting from a margarine emulsion of the o/w type. Such emulsions are often referred to as "creams". This emulsion is very unstable, inter alia, because it contains only about 16% water, forming the continuous phase. To prevent demixing, the emulsion must be agitated during pasteurisation. Subsequently the emulsion is cooled down, e.g. by pouring it onto cooling drums. The o/w system is so unstable that spontaneous phase inversion occurs upon contact of the emulsion with the chilled surface of the drum. A similar preparation via phase inversion without separation of buttermilk, is described in DE-B-198 508. The o/w emulsion is passed through a closed cooler. Upon cooling, the o/w emulsion inverts spontaneously to the w/o structure.

Nowadays, as described in Bailey's Industrial Oil and Fat Products, Volume 3, John Wiley & Sons, New York, (1985), pp. 77–84, margarine is commonly prepared by preparing a water-in-oil emulsion, cooling and working the emulsion to plastify it, optionally passing it through a resting tube, and packing it.

The cooling and working treatments are carried out by passing the emulsion, of which the fat is essentially completely molten, via a high-pressure positive pump, through a series of scraped-surface heat exchangers, chilled e.g. with liquid ammonia (called A-units), and stirred crystallisers having pins on a variable-speed shaft intermeshing with stationary pins on the cylinder wall (called C-units). C-units may be positioned before, in between or after the A-units in the production line.

The A-units are typically operated at shaft speeds of 300 to 700 rpm. They do not serve solely to cool the emulsion; the high internal pressures and shearing forces generated by the blades and their holding pins cause rapid crystal nucleation and further emulsification. The cooling rate in the A-units is so high that the emulsion emerging from it is undercooled. Crystallisation proceeds in the subsequent C-units, and furthermore, in the C-units, large crystals are broken up by the agitation. Such cooling and working apparatus is generally referred to as a "Votator line", "Votator" being a registered trade mark.

It will be noted from the above that the production processes of margarine and butter are markedly different.

One of the most striking product differences between typical margarines and butter is the comparative ease with which the margarines can be spread. Improvements on the spreadability of butter can be accomplished by the addition and intimate mixing of a low-melting oil, such as a vegetable oil. A product of this type, "Bregott", has been manufactured in Sweden since 1970 with increasing success. Such products, containing both butterfat and vegetable oil are known as "MELANGE" products. These products are favoured not only for their ease of use, but also for dietary and economic reasons. For example, a melange product can contain a high proportion of polyunsaturated fatty acids; the dietary preference for such acids being well established.

While the present invention will be described with particular reference to products containing both butterfat and vegetable oil, it should be noted that the invention extends inter alia to products containing butterfat and non-dairy fats in general. Thus, marine oils can replace the vegetable oil of melange products in whole or in part. Moreover, a quantity of the oil may be replaced by a suitable fat replacer, such as a sucrose-fatty acid ester. Thus the term "non-dairy fat" should be read as including fat replacer within its scope.

In the production of melange products a variety of methods have been proposed to accomplish the addition of the vegetable oil to the dairy fat. A range of methods are discussed in "Nordeuropaeisk mejeritidsskrift" N° 8-9/90 p. 217. These include: addition of vegetable oil to milk before the separation of cream for buttermaking, addition of vegetable oil to cream before or after pasteurisation and reworking of butter with oil after churning.

All of these variant processing routes have a tendency to mask butter flavour with a "margarine" flavour, especially where low levels of butter on total fat are employed. This alteration of flavour has been described as "oiliness" and has resulted in the melange products scoring lower than butter in taste-trials. To some extent this problem can be overcome by the addition of flavouring agents. However, while these flavouring agents are often of natural origin, they can be expensive to produce and are generally not preferred by the consumer.

Furthermore, rather more specific difficulties have been met with the processing routes described above.

Where vegetable oils are added prior to churning, difficulties have been met in that the resulting mixture will not churn. This restricts the possible choice of vegetable oils. It has been proposed to overcome this problem by the use of additives such as purified milk proteins, lecithin and/or other emulsifiers. As with the flavouring agents discussed above, the use of these additives is not acceptable to all consumers.

Where vegetable oils are added after churning, difficulties have been met in retaining the valued texture and mouth-feel of butter, as the reworking process is often so disruptive that the characteristic structure of butter is lost.

For example, GB 1 598 362 discloses a process in which butter oil or molten whole butter is vigorously stirred with an aqueous phase prepared from skimmilk or sweet buttermilk. vegetable oil may be added to the butter or butter oil phase before addition of the aqueous phase; milk salts, such as caseinates, are added to the buttermilk prior to combination with the fat phase. During this process the structure of the butter is almost completely lost if not entirely disrupted.

Australian patent 526 763 is generally concerned with overcoming the impact of seasonal cream production on buttermaking plant operation. The patent teaches how a fat or oil may be included in butter after separation of buttermilk to prevent loss of the fat or oil in the buttermilk. The dispersion of the fat or oil through the butter is accomplished by applying shearing forces at a shear rate in excess of 50 s$^{-1}$. This can be accomplished by charging the fat or oil into the second stage of a buttermaking machine, that is the "kneading" stage. This Australian patent also discloses, in very general terms, the use of a cream to introduce the fat or oil into the butter. In each case it is considered important that "dispersal of the fat or oil through the butterfat product is effected under conditions of substantial shear action". An advantage of this process is that the buttermilk produced is of a high quality as it contains low levels of fat, minimising the fat loss into this by-product. However, the by-product is still produced in large quantities.

Some uses for buttermilk, as mentioned above, are in the manufacture of animal feeds and the preparation of margarines.

For example, SU 1 143 375 discloses a low-fat butter which contains a protein filler obtained by coagulating buttermilk. The use of buttermilk proteins is further discussed in GB 2 158 452. Jp 84/021578 discloses a process in which buttermilk is used to dilute a cream and the mixture subsequently made into butter. The preparation of a similar cream is discussed in SU 793 554.

The disadvantages of the above-mentioned art include a disparity between buttermilk production and consumption by the processes. Moreover, the processes often require complex and expensive processing equipment. Complete processing and disruptive treatment of the materials is also disclosed in EP 0 185 631.

DETAILED DESCRIPTION OF THE INVENTION

The present invention seeks to overcome some or all of the above-mentioned difficulties by making use of both a non-dairy fat and substantially all the ingredients of dairy cream, and employing a special mixing regime. According to a first aspect of the present invention there is provided a process for preparing an edible plastified dispersion comprising a continuous fat phase and a dispersed aqueous phase, characterised in that it comprises the steps of:

(a) working buttermilk with a non-dairy fat to obtain an emulsion, and, (b) mixing the emulsion obtained in step (a) with butter under mild working conditions.

By employing buttermilk in the aqueous phase a melange product can be obtained substantially without any waste product. The butter present in the final product retains a typical butter microstructure as it has not been subjected to conditions which destroy this microstructure. The perceived butter taste is relatively good for particular proportions of butter on product. It is believed that the organoleptic properties are in part determined by the constituents of the buttermilk, particularly by the presence of natural membrane phospholipids.

Typically, the mild working conditions are conditions of low shear. By employing conditions of low shear it is possible to achieve a sufficient degree of mixing without destroying the characteristic microstructure of the butter. Thus, churning of the non-dairy fat and the accompanying difficulties are avoided. A particular advantage of not also having to churn the non-dairy fat is manifested in products having a high proportion of this fat, as only the butter need be churned and a smaller churn can thus be employed for a given throughput.

Conveniently, step (b) is performed in a mixer comprising two closely spaced, mutually displaceable surfaces, each having a pattern of cavities which overlap during relative movement of the surfaces. Such a mixer is known as a "Cavity Transfer Mixer" and is described in more detail in our European Patent Application 0199397.

Preferably, step (a), the working of buttermilk with a non-dairy fat, is performed in a scraped-surface heat exchanger such as a "votator" or other cooling and working line. The proportioning ratio chosen depends on the desired end fat content of the product. More preferably, this line includes at least one so-called "A-unit" followed by at least one so-called "C-unit". The emulsion produced by step (a) is most preferably a water-in-oil (w/o) emulsion in which the vegetable fat is the continuous phase, that is, it is "a liquid margarine" rather than a "cream".

In an embodiment of the invention, the method further comprises the step of churning and separating cream to obtain butter for use in step (b) and buttermilk for use in step (a).

In this embodiment it can be seen that the production of buttermilk at the churn provides a generally, if not wholly, natural basis for the water phase of the melange product. The water phase of the non-dairy component, that is the emulsion of step (a), contains all the components of the original cream which would normally have been lost in the churning process. By selecting a suitable original cream fat content, and a suitable non-dairy fat proportion, it is possible to embody the invention as a "non-waste" process, as illustrated by the examples below, and avoid the production of surplus buttermilk.

In a preferred embodiment, the cream is a ripened cream. It is envisaged that such ripening may be so-called chemical or bacteriological ripening. By chemical ripening are meant those processes in which a chemical acidifying agent is added to the cream, whereas in bacteriological ripening a microbial culture is inoculated into the cream and the acid products of the subsequent cell growth accomplish a similar result.

Particularly preferable non-dairy fats include vegetable and animal fats, including marine fats. Suitable vegetable fats include soya bean oil, sunflower oil, coconut oil, olive oil, safflower oil and other food oils of vegetable origin.

In order to vary the properties of the eventual product, two or more of the above-mentioned oils may be blended together. Moreover, the oils may be modified by interesterification and/or hydrogenation. Thus, non-dairy fat blends are envisaged which contain a plurality of components including hardstock components. It is useful to vary these components from time to time, so as to maintain constant product properties in view of variations in the composition of the butterfat with source and season.

In order to further vary or maintain the properties of the final product, a variety of additional components may be included in a suitable non-dairy fat blend. These components include emulsifiers, colouring agents and vitamin supplements, as well as optional butterfat in minor proportions.

Optionally, dairy or non-dairy gelling or thickening agents may be included in the cream, buttermilk or the emulsion obtained from step (a).

According to a second aspect of the invention there is provided an edible spread which comprises :
(a) A phase rich in butterfat containing butter granules;
(b) A separate phase rich in non-dairy fat; and
(c) A phase containing substantially all the aqueous components of buttermilk.

By providing a product with two discrete fat phases, one of which contains butter granules and the other of which contains a non-dairy fat, it is possible to attain the desired unctuousness of butter while reducing the proportion of butterfat present. Moreover, such a product does not soften for up to an hour after removal from cold storage conditions, depending on the fat phases present.

The fat content of the product can be varied by suitable choice of the original cream fat content, the amount of non-dairy fat added and/or the aqueous phase proportion. In embodiments of the invention, fat contents on final product of 40% to 80% by weight are preferred and fat contents of 50-60% particularly preferred.

In order that the invention may be further understood, it will be explained with reference to an example as follows, and with reference to the accompanying drawings, which show in schematic form a plant for the performance of the present invention. Certain ancillary heating and cooling apparatus, process control equipment and pumps have been omitted from the drawings for the sake of clarity.

Figure 1:
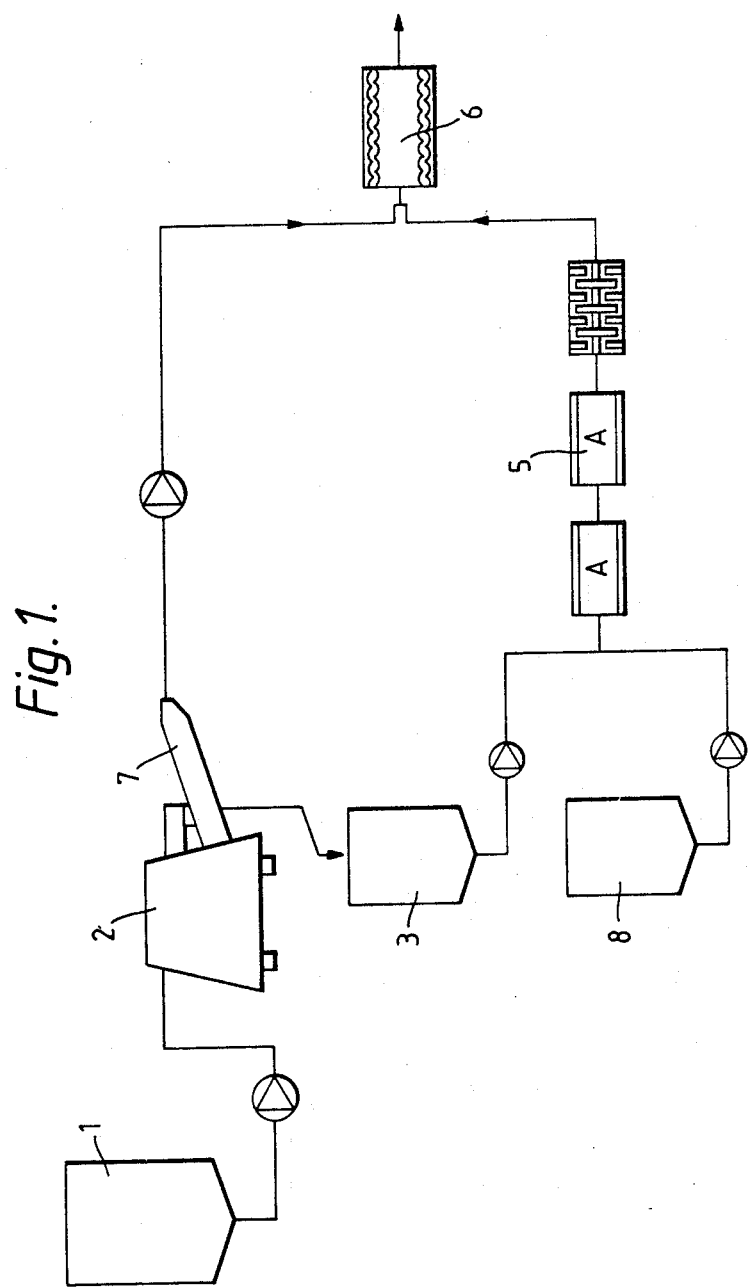
FIG. 1 shows a plant for the production of an 80% fat product.
Figure 2:
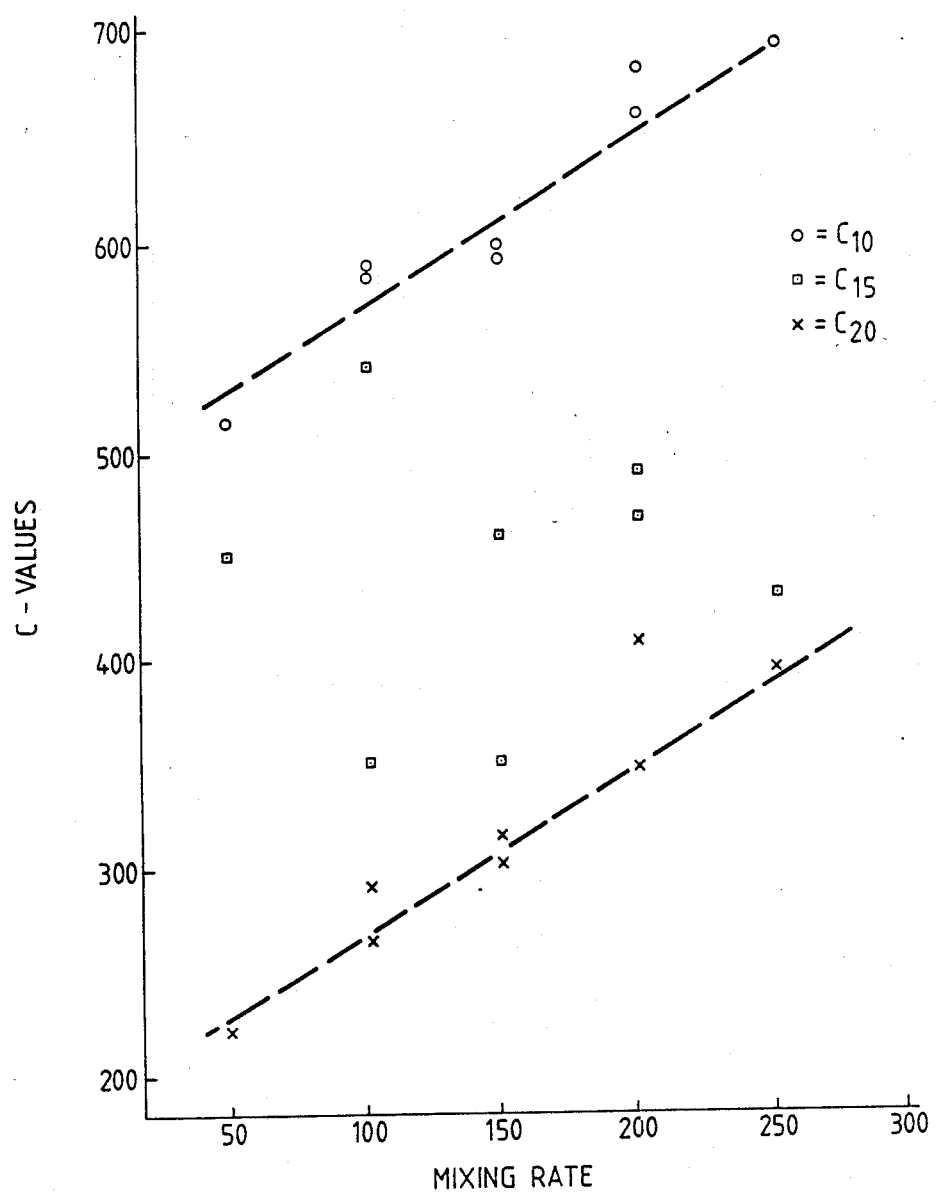
FIG. 2 (Graph 1) shows the variation in product properties obtained by variation of process conditions.

EXAMPLE 1:

Preparation of 80% fat product

Dairy cream containing 0.5% potassium sorbate was pasteurised and cooled to 5° C. The cooled cream was chemically soured to - pH 5.0. The soured cream was kept overnight in storage tank (1). Before churning, the cream was heated to 12° C. The cream was churned in a conventional continuous buttermaker (2) and the buttermilk separated. The buttermilk was continuously fed to a chilled water-phase tank (3). From the chilled water phase tank (3) buttermilk was continuously mixed with a vegetable fat phase from tank (8). This vegetable fat phase comprised 99.5% vegetable fat blend, 0.5% monoglyceride emulsifier and a trace of beta-carotene colourant. The vegetable fat blend used in this example comprised a blend of 15% palm oil, 43% of a palm oil mid-fraction and 42% sunflower oil. The mixing of the vegetable fat phase and buttermilk was performed in a "votator" line (5) under such conditions as to produce a water-in-oil emulsion. In the presence of high-melting vegetable fats it is necessary to warm the vegetable fat phase prior to mixing. The final temperature of the emulsion was 4° C. The feed rate of buttermilk into the "Votator" line (5) was ~ 17.5 kg/hr. The feed rate of the vegetable fat phase into the "Votator" line was 70 kg/hr. The "Votators" line contained a sequence of the type known in the art as "A"–"C". The temperature of the product was 4° C.

Butter from the kneader (7) was pumped into a cavity transfer mixer (6) at a feed rate of 17.5 kg/hr, and at a temperature of ~ 15° C. Analysis of this butter revealed that it contained 38% by weight of solid fat. The emulsified buttermilk/vegetable fat was fed into the cavity transfer mixer (6) at a rate of 87.5 kg/hr, and gently mixed to produce product at a rate of 105 kg/hr. It is to be noted that the output flux of 105 kg/hr equals the input flux of 35+70 kg/hr for the process.

The melange product obtained was analysed for value of $C_{10}$, $C_{15}$ and $C_{20}$, and gloss.

C values were determined immediately on production and after three days, the latter measurements being performed by the method of Haighton et al. JAOCS 38, 345 1959, at the indicated temperatures. A C-value in the range 125–700 has been considered as representative of excellent spreadability, at that temperature. The relatively high $C_{20}$ values ensure good "stand-up" properties when removed from low-temperature storage. This property is retained after repeated temperature cycling.

Gloss (G) was measured as % reflection at an incident angle of 60° at a temperature of 15° C. The results were typical for butter, and similar to those obtained for low-calorie spreads.

Typical C-values after storage for three days are given in Table 1.

Microstructural analysis of the product by means of an electron microscope revealed that many regions having a typical butter-like structure existed throughout the product. Further regions are found which comprised the water-in-oil emulsion produced by the emulsification of buttermilk with oil. It is believed that this plurality of phase types was a major factor in determining the properties of the product.

TABLE 1

| Measuring Temperature | C-value |
| --- | --- |
| 5° C. | 1700 |
| 10° C. | 1250 |
| 15° C. | 800 |
| 20° C. | 170 |

EXAMPLE 2:

Preparation of 80% fat product

The method of Example 1 was repeated except that 4% palm oil hydrogenated to a melting point of 44° C., 26% palm oil hydrogenated to a melting point of 36° C., 18% rapeseed oil hydrogenated to a melting point of 30° C. and 52% liquid bean oil were used as the vegetable fat phase. The C-values obtained are given below:

| Measuring Temperature | C-value |
| --- | --- |
| 5° C. | 800 |
| 10° C. | 500 |
| 15° C. | 350 |
| 20° C. | 100 |

EXAMPLE 3:

Preparation of 60% fat product

The method of Example 1 was repeated except that the feed rate of vegetable fat into the "votator" line was 17.5 kg/hr and the emergent temperature was 15° C. It was found preferable to include some gelling or thickening agent in the vegetable fat phase. In this Example gelatin at a concentration of 0.83% on final product was employed. In this Example the vegetable fat blend rather than the single vegetable fat fraction was employed. As with Examples 1 and 2, the output volume of the process equalled the input volume of the process; in this instance the output was 52.5 kg/hr. The C-values of the product obtained are given below at the indicated temperatures.

| Measuring Temperature | C-value |
| --- | --- |
| 5° C. | 1500 |
| 10° C. | 750 |
| 15° C. | 320 |
| 20° C. | 115 |

EXAMPLE 4:

Effect of processing conditions on product properties

In order to confirm that a range of products could be manufactured according to the method of the invention, further production trials were performed. The results of these trials are shown in graph 1. The graph plots hardness on the y-axis against mixing rate in the gentle mixing stage on the x-axis. It will be noted that the hardness at 10° C. and 20° C. are largely controlled by the mixing rate, whereas the hardness at 15° C. may be varied considerably between the upper and lower limits defined by the hardness ($C_5$) at 10 and 20° C. In the plotted trials, the fat blend remained constant, and the variation in $C_{15}$ values was obtained by selecting a particular temperature in the range of 12-19° C. for the coolant supplied to the mixer, which in this instance was a cavity transfer mixer.

It is envisaged that this type of process control can be used to counteract variations in the properties of butterfat which are known to occur with wource and season.

All of the products showed butter grains when examined under the microscope, the number of which reduced as the mixing rate was increased.

We claim:

1. A process for preparing an edible plastified dispersion comprising from 40-80 wt% of a continuous fat phase and from 60-20 wt% of a dispersed aqueous phase, which process comprises the steps of:
    (a) churning cream to obtain butter and buttermilk,
    (b) working the buttermilk obtained in step (a) with a non-dairy fat to obtain a water-in-oil emulsion, and
    (c) mixing the emulsion obtained in step (b) with butter obtained in step (a) under working conditions of sufficiently low shear that the granular structure of the butter is preserved.

2. A process as claimed in claim 1, wherein the working of buttermilk and non-dairy fat is performed in a scraped-surface heat exchanger.

3. A process as claimed in claim 1, wherein the non-dairy fat is an animal, marine or vegetable fat.

4. A process as claimed in claim 1, further comprising the step of adding a gelling or thickening agent to the buttermilk obtained in step (a) before use in step (b).

* * * * *